(12) United States Patent
Antoine

(10) Patent No.: US 7,535,473 B2
(45) Date of Patent: May 19, 2009

(54) COLLABORATIVE ENVIRONMENTS IN A GRAPHICAL INFORMATION SYSTEM

(75) Inventor: Lennox Antoine, Atlanta, GA (US)

(73) Assignee: Erdas, Inc., Norcross, GA (US)

( * ) Notice: Subject to any disclaimer, the term of this patent is extended or adjusted under 35 U.S.C. 154(b) by 564 days.

(21) Appl. No.: 11/232,358

(22) Filed: Sep. 20, 2005

(65) Prior Publication Data

US 2007/0064005 A1 Mar. 22, 2007

(51) Int. Cl.
| | |
|---|---|
| G06F 15/16 | (2006.01) |
| G06T 13/00 | (2006.01) |
| G06T 15/70 | (2006.01) |
| G06F 15/00 | (2006.01) |
| G06T 1/00 | (2006.01) |
| G09G 5/00 | (2006.01) |
| G06T 15/20 | (2006.01) |

(52) U.S. Cl. .................. 345/502; 345/428; 345/473; 345/501; 345/629

(58) Field of Classification Search .............. 345/473, 345/629
See application file for complete search history.

(56) References Cited

U.S. PATENT DOCUMENTS

| | | | |
|---|---|---|---|
| 5,144,685 A | 9/1992 | Nasar et al. | |
| 5,781,195 A | 7/1998 | Marvin | |
| 5,848,373 A | 12/1998 | DeLorme et al. | |
| 6,014,614 A | 1/2000 | Herring et al. | |
| 6,122,628 A | 9/2000 | Castelli et al. | |
| 6,134,541 A | 10/2000 | Castelli et al. | |
| 6,161,105 A | 12/2000 | Keighan et al. | |
| 6,381,605 B1 | 4/2002 | Kothuri et al. | |
| 6,470,344 B1 | 10/2002 | Kothuri et al. | |
| 6,505,205 B1 | 1/2003 | Kothuri et al. | |
| 6,604,068 B1 | 8/2003 | Bukowski et al. | |
| 6,684,219 B1 | 1/2004 | Shaw et al. | |
| 6,850,235 B2 | 2/2005 | Levanon et al. | |
| 6,865,582 B2 | 3/2005 | Obradovic et al. | |
| 2001/0034588 A1 | 10/2001 | Agrawals et al. | |
| 2003/0088362 A1* | 5/2003 | Melero et al. .................. | 702/2 |

(Continued)

FOREIGN PATENT DOCUMENTS

WO 01/98925 A2 11/2000

OTHER PUBLICATIONS

Lourena Rocha, Sérgio Pinheiro, Marcelo B. Vieira, Luiz Velho. *A Framework for Real-Time Terrain Visualization With Adaptive Semi-Regular Meshes.* (2004) pp. 491-506.

(Continued)

Primary Examiner—Kee M Tung
Assistant Examiner—Jacinta Crawford
(74) Attorney, Agent, or Firm—Workman Nydegger

(57) ABSTRACT

Collaborative environments in a geographic information system (GIS). Collaboration between multiple processors can be provided within the GIS. A first processor can stream to a server session list entry describing an edit conducted on an image by the first processor. The first processor can also stream a scenario describing geo-spatial analysis of the image conducted by the first processor. The first processor can also stream images along with an animated window. The server can stream the session list entry, the scenario, and/or the images along with animated window to a second processor. The image can include three dimensional data and streaming of data can occur across networks such as the Internet.

12 Claims, 6 Drawing Sheets

U.S. PATENT DOCUMENTS

2004/0217980 A1    11/2004    Radburn et al.
2005/0091223 A1    4/2005    Shaw et al.

OTHER PUBLICATIONS

Referenten der Arbeit: Prof. Dr. J.L. Encarnacão and Prof. J. Rossignac, PhD. *Graphical Abstraction and Progessive Transmission in Internet-based 3D-Geoinformationsystems.* Tag der Einreichung: Dec. 17, 2002. Tag der mündlichen Prüfung: Jan. 29, 2003. Darmstädter Dissertationen 2003.

Iiannis Kompatsiaris, Dimitrios Tzovaras, and Michael G. Strintzis. *Hierarchical Representation and Coding of Surfaces Using 3-D Polygon Meshes*, IEEE Transactions on Image Processing, vol. 10, No. 8, Aug. 2001. pp. 1133-1151.

Maria José Abásolo, Francisco Perales, and Armando De Giusti. *Geometric-Textured Bitree: Transmission of a Multiresolution Terrain Across the Internet.* JCS&T vol. 2 No. 7, Oct. 2002. pp. 34-41.

Prof. P. Widmayer. *Multiresolution Terrain Triangulation using a Delaunay Hierarchy.* Institute of Theoretical Computer Science. Department of Computer Science, Semester Thesis, Jul. 31, 2001.

Dieter Schmalstieg and Michael Gervautz. *Demand-Driven Geometry Transmission for Distributed Virtual Environments.* Institute of Computer Graphics, Vienna University of Technology, Austria. Computer Graphics Forum, vol. 15, Issue 3. pp. 421-432. (1996).

Klaus Engel, Ove Sommer, Christian Ernst, Thomas Ertl. *Remote 3D Visualization using Image-Streaming Techniques.* Computer Graphics Group, Universität Erlangen-Nürnberg, Germany. International Symposium on Intelligent Multimedia and Distance Education. (1999).

John S. Falby, Michael J. Zyda, David R. Pratt and Randy L. Mackey. *NPSNET: Hierarchical Data Structures for Real-Time Three-Dimensional Visual Simulation.* Naval Postgraduate School, Code CSZk, Dept. of Computer Science, Monterey, California. In *Computer & Graphics*, vol. 17, No. 1, pp. 65-69. (1993).

Takahara, Atsushi. *Versioning and Concurrency Control in a Distributed Design Environment*, LSI Design Systems Laboratory NTT LSI Laboratories, 3-1 Morinosato-Wakamiya, Atsugi-shi, Kanagawa-ken, 243-01 Japan. (1992) pp. 540-543.

\* cited by examiner

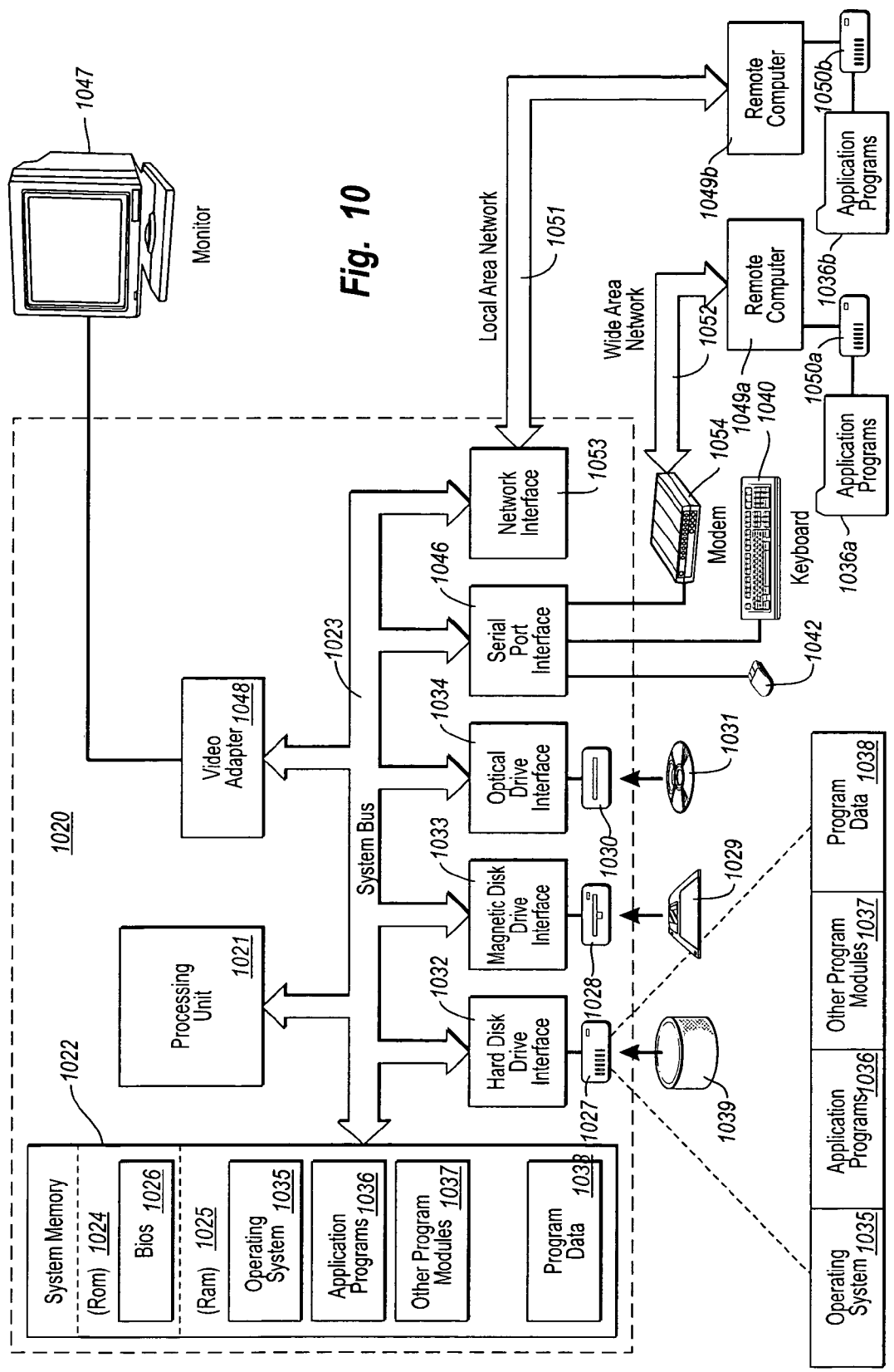

COLLABORATIVE ENVIRONMENTS IN A GRAPHICAL INFORMATION SYSTEM

BACKGROUND OF THE INVENTION

1. The Field of the Invention

The present invention relates generally to Geographic Information Systems (GIS). More specifically, the present invention relates to collaborative environments in GIS.

2. The Relevant Technology

Geographic information systems are widely used in areas such as commerce, government defense, environmental research, and academic research. These systems are tools that allow for the processing of spatial data into information typically tied explicitly to, and used to make decisions about, some portion of the earth (i.e. geo-spatial data). Geographic information systems can deal with space-time data and often employ computer hardware and software (i.e. executable instructions) for storage, manipulation, analysis, and presentation of the data to a user.

Many aspects of current GIS modeling are based at least in part on traditional cartography. In traditional cartography, the cartographer compiles or records a map made up of points, lines, and areas on a physical medium, such as paper. Data can be collected from such sources as aerial photography, digital remote sensing, surveying, visual descriptions, and census and statistical data. In GIS, data collection sources include the same sources as those used for traditional mapping, but can also include a wide variety of digital sources, such as digital line graphs (DLGs), digital elevation models (DEMs), digital orthophotoquads, digital satellite imagery, as well as many others.

Various computer hardware and software components can be implemented to manipulate and analyze the data collected. Queries of GIS data storage and retrieval device can be made and context-specific information can be recalled along with image data for analysis. GIS analysis device can analyze the geo-spatial data to compare and contrast patterns of earth-related phenomena. Geographic information system analysis can use computers to measure, compare, contrast, and describe the contents of the databases. Analysis of the data can also permit aggregation and reclassification for further analysis.

GIS have many advantages over the graphic map in that queries can be made of the data and only the desired context-specific information recalled. In general, GIS store the graphic locations of point, line, and polygon objects and their associated characteristics (attributes). This format emphasizes formulating queries and asking the appropriate questions, rather than overall map interpretation.

GIS model can include raster and/or vector models. A raster data model represents spatial data as a matrix of pixels. The raster data model, in essence, consists of values for each pixel on a computer monitor. The pixels are lit up via a raster scan, which is a technique for generating or recording the elements of a display image by means of a line-by-line sweep across an entire display space. In contrast to the raster data model, a vector data model is an abstraction of the real world in which elements are represented in the form of points, lines, and polygons. Objects can be displayed along with (e.g., can overlay) vector and raster data. Object can refer to anything with object attributes, where object attributes are attributes characterizing at least part of an object to be displayed, such as area of a surface or footprint, longest single dimension, or a volume. An object can be a building, for example. A building can have overlaid raster (e.g. to provide color for the roof), texture (e.g. to create windows and bricks on a side of the building), or height data. An object can also include vector data representing, for example, a road, fire hydrant, etc.

Using the building blocks of rasters and vectors, GIS can be used to analyze land based activity, such as ownership or management of land, habitat evaluation, conservation easement procurement, wildlife evaluation, earthquake and landslide prediction, flood hazard abatement, chemical contamination evaluation, forest and range management, scientific investigation, as well as many other applications. For such varied applications of GIS, large amounts of data typically must be accessed and processed. In systems in which GIS data is transmitted over a network, such as the Internet, data transmission latencies can limit the effectiveness of geographic information systems and the amount of resolution that can be reasonably displayed. GIS data also often requires editing by GIS processors, which can complicate access to the GIS data and the edits made by the GIS processors. It may be advantageous for multiple users to collaborate on such analysis and editing. Thus, it would be advantageous to improve streaming objects in GIS, which would enhance the ability to use networked geographic information systems and improve the quality of the displayed data. Further, there is a need for improved collaboration between GIS processors for analysis and editing.

BRIEF SUMMARY OF THE INVENTION

Several embodiments disclosed herein relate to providing a collaborative environment in a graphical information system. In a graphical information system, a method for providing collaboration between multiple processors within the GIS is described. The method can include receiving from a first processor at least one of the members of a set that includes a session list entry describing an edit made to the image by the first processor, a scenario including parameters for geo-spatial analysis of the image conducted by the first processor and/or a result of the geo-spatial analysis conducted by the first processor, and images along with computer executable instructions for animating a window. The animated window can include a removed portion of a first image superimposed over a second image, wherein the animated window exposes different portions of the second image at different points in time. The method can further include transmitting to a second processor at least one of the members of the set that includes the session list entry, the scenario, and the images along with the instructions for animating the window.

In GIS, a method for a first processor accessing image data to collaborate with a second processor accessing the same image data. The method can include accessing the image data at the first processor. The method can further include performing at the first processor at least one of the members of the set that includes, an edit of the image data, a scenario including analysis of the image data, or displaying at the first processor a first image superimposed over a second image with an animated window removing a portion of the first image to expose different portions of the second window in time. The method can further include transmitting from the first processor to a server for distribution to the second processor at least one of the members of the set that includes a session list entry describing the edit, the scenario including parameters for analysis of the image conducted by the first processor and/or a result of the analysis conducted by the first processor, and the images along with instructions for animating the window.

A method for synchronizing image data being accessed simultaneously by two processors is disclosed. The method can include receiving a session list entry describing an edit conducted on image data describing a scene at a first processor. The method can further include determining whether a second processor is accessing the same session and image data. If the second processor is accessing the same session and image data, the method can further include transmitting the session list entry describing the edit to the second processor such that the second processor can execute the same edit and synchronize the session and image data at the second processor with the session and image data at the first processor. The method can further include storing the session list entry describing the edit in memory.

A method for synchronizing image data at a first processor with a second processor accessing the same image data is described. The method can include performing an edit of the image data at the first processor. The method can further include transmitting a session list entry describing the edit from the first processor for distribution to the second processor such that the second processor executes the same edit and synchronizes the image data at the second processor. The method can further include storing the session list entry describing the edit to a session list.

A method for displaying superimposed images is described. The method can include displaying a first image. The method can further include displaying a second image superimposed over the first image. The method can further include displaying an animated window portion of the second image. Displaying the animated window can include removing a portion of the second image so as to expose the underlying portion of the first image located underneath the window portion. Displaying the animated window can further include animating the window portion so as to remove different portions of the second image at different points in time so as to expose different portions of the first image at the different points in time.

In GIS, a method for streaming a scenario between multiple processors for collaboration between users of the multiple processors is described. The method can include receiving a scenario from a first processor, the scenario comprising parameters for conducting geo-spatial analysis of image data and/or a result of geo-spatial analysis conducted on the image data at the first processor. The method can further include transmitting the scenario to a second processor.

In a computer-readable medium, a session list data structure is disclosed. The session list data structure can include a first data field containing an identifier associating the session list data structure with a set of image data, the set of image data describing a scene. The session list data structure can include a second data field containing an identifier associating the session list data structure with a session of edits conducted on the set of image data. The session list data structure can include a third data field comprising a first session list entry describing a first edit to the set of image data conducted during the collaboration session of edits conducted on the set of image data.

These and other features of will become more fully apparent from the following description and appended claims, or may be learned by the practice of the invention as set forth hereinafter.

BRIEF DESCRIPTION OF THE DRAWINGS

To further clarify the above and other advantages and features, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 10 illustrates a suitable computing environment in which several embodiments may be implemented.

DETAILED DESCRIPTION OF THE PREFERRED EMBODIMENTS

The embodiments disclosed herein relate to streaming objects in GIS. The embodiments are described with reference to the attached drawings to illustrate the structure and operation of example embodiments. Using the diagrams and description in this manner to present the invention should not be construed as limiting its scope. Additional features and advantages of the invention will in part be obvious from the description, including the claims, or may be learned by the practice of the invention. Descriptions of well-known components and processing techniques are omitted so as not to unnecessarily obscure the explanation of the example embodiments discussed herein.

Several embodiments disclosed herein can be used to stream data (i.e. transmit or download data) over a network from a server to a client. Several embodiments disclosed herein can also provide for collaboration between multiple clients of edits made to GIS data and analysis of GIS data by other clients. The network can be a local area network (LAN) or can be a wide area network (WAN), such as the Internet. An object (i.e. data describing objects which can be superposed over other image data) can be streamed over a network to allow clients to view and modify the object. This data can be organized in quadtrees. An aspect of several embodiments disclosed herein relates to organizing objects and selectively streaming the object to improve transmission time and reduce the amount of object data that needs to be streamed, while also maintaining performance and the quality of the displayed image. Another aspect of several embodiments disclosed herein relates to providing collaborative environments in GIS.

1. Organizing Image Data in Quadtrees

Objects do not have an innate location structure (in contrast to image data, otherwise known as raster data) and therefore must have some scheme for organizing it so that it appears in the correct place on the display when viewed by a user. A quadtree can provide this scheme. A quadtree is a spatial index that recursively decomposes a data set (e.g. an image) into quadrants (e.g. square cells) of different sizes until each quadrant has less than a threshold data density. If a quadrant of an image has a greater amount of the object data (i.e. a greater object data density) in that quadrant than the threshold, that quadrant can be more deeply partitioned. In this manner, the object data density within each quadrant of the quadtree can be limited. As a result, when an area of interest in an image is selected, the computer need only draw the objects on the image quadrant of the quadtree, rather than retrieving objects located somewhere within entire display but not visible on the selected area of interest.

Figure 1:
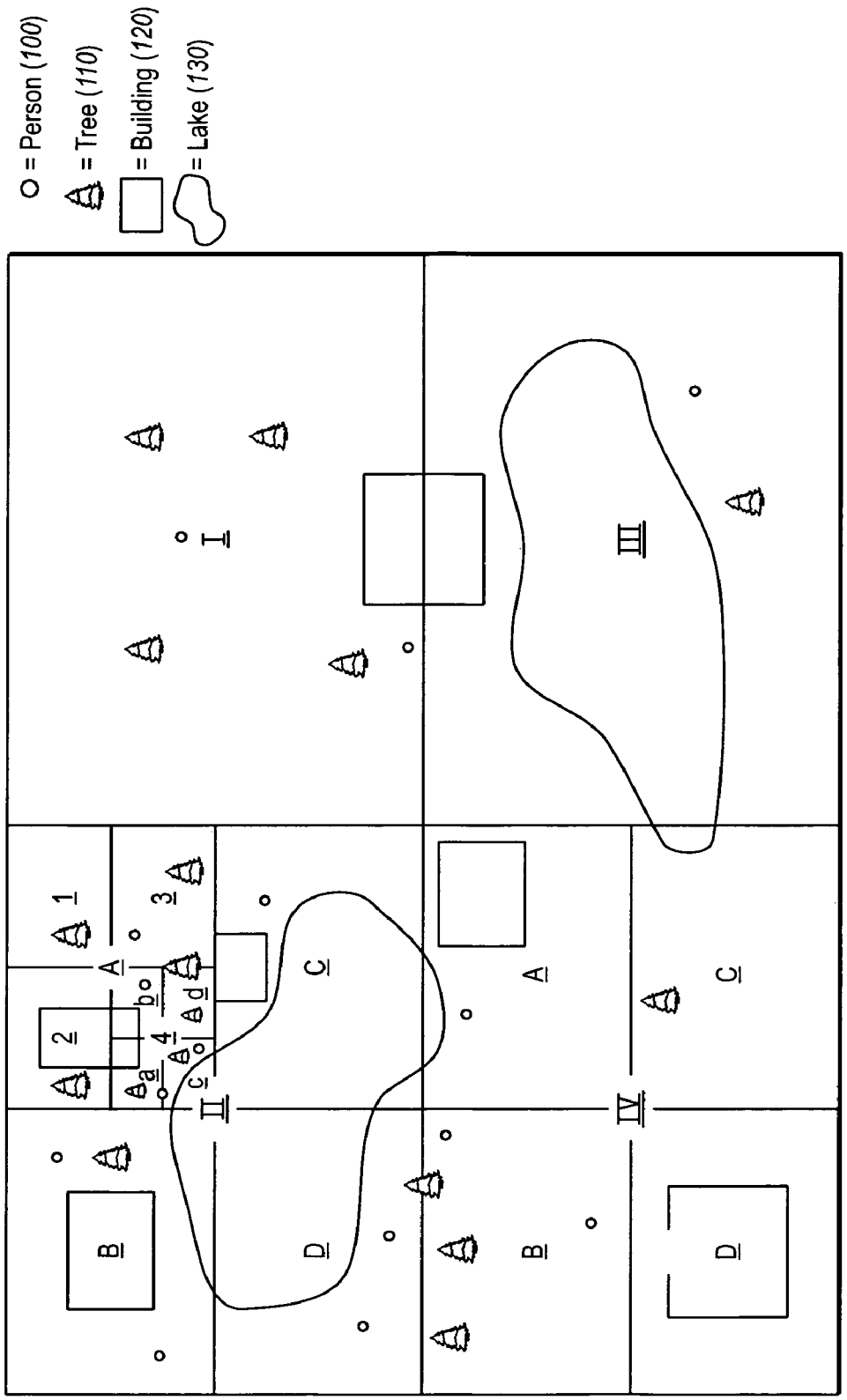
FIG. 1 illustrates a schematic representation of a display including objects.

Referring to FIG. 1, a representation of a display including objects (e.g., polygons, points, lines, etc.) is illustrated. The data for displaying and/or describing the objects can include vector data as well as attributes data, such as the attribute data discussed above. The objects can be superimposed over other image data. The image (raster or vector) data and the associated objects can be stored in a mass storage device of GIS and its associated network components, such as the systems described in greater detail below with reference to FIGS. 4, 9 and 10. The objects can represent three-dimensional objects such as people 100, trees 110, buildings 120, lakes 130, etc. The objects shown are examples of geometry that can be overlaid upon the image. The image data is preferably partitioned into quadrants based at least in part on the location of the objects on the image. The distribution of the objects across the image often will not be entirely uniform, however. As shown, there may be a greater amount of objects (i.e. a greater object data density) in some quadrants than other quadrants.

According to the example shown in FIG. 1, the image has first been divided into four quadrants I-IV. The layout and object data density within each quadrant can then be determined. As a result of the object data density in each quadrant, the image and an object can be further divided into additional quadrants. Object data density threshold, for example, can be used to determine when a quadrant will be further divided into additional quadrants.

Quadrant IV has been divided into four additional quadrants A, B, C, and D. The further division of quadrant IV can be a result of the amount of objects within quadrant IV. As shown, quadrant IV can be divided in fourths to produce four quadrants A-D, and each of quadrants A-D can have an amount of object data lower than a object data density threshold thereby not requiring that quadrants A-D be further divided. Quadrants A-D can be referred to as child quadrants of quadrant IV.

As shown, quadrant II has also been divided into four quadrants A-D. Quadrant A has been further divided into four quadrants 1-4; and quadrant 4 has been further divided into four quadrants a, b, c and d. Thus, an image can be divided into quadrants, and quadrants can be further divided into additional quadrants until each quadrant includes an amount of object data (corresponding to objects displayed in that quadrant) that satisfies an object-data threshold per quadrant. As a result, the amount of object data transmitted in response to a request for an object within a particular quadtree can be minimized.

2. Selective Streaming of Objects

According to an aspect of an embodiment, an object within each quadrant can be organized based on an attribute and selectively streamed in response to a request based on a Level of Detail (LOD). The objects and other image data can represent two dimensional or three-dimensional objects and terrain when rendered on a screen. A user can request an object, along with vector, raster, and other image data, from a data storage and retrieval subsystem of GIS for manipulation and analysis. The request can be defined by a quadrant or a particular portion of the quadtree including an object along with, or separate from, image, raster, and/or vector data. The object can be retrieved, streamed, and displayed as geometry overlaid over the image, raster, and/or vector data. The request for the object and the resulting transmission of data can be performed, for example, in a geographic information system and associated network infrastructure, such as the systems described in greater detail below with reference to FIGS. 4, 9 and 10.

A rendering of the image, raster, vector, and/or object data can be from several different viewpoints. The viewpoint of the rendering, or scope of the manipulation and analysis, can dictate a LOD that may be needed (or even observable). For example, an image of the Earth's surface rendered from the viewpoint of a satellite requires a different LOD than a rendering of an image from the viewpoint of a helicopter hovering a few hundred feet overhead. In the first example of a satellite, streaming geometric detail of a person or tree may not be necessary, whereas in the second example of a helicopter hovering at a few hundred feet overhead streaming geometric detail of a person or a tree may be necessary or desirable. Thus, the LOD for an object can vary based on the viewpoint of the rendering, or scope of analysis.

Figure 2:
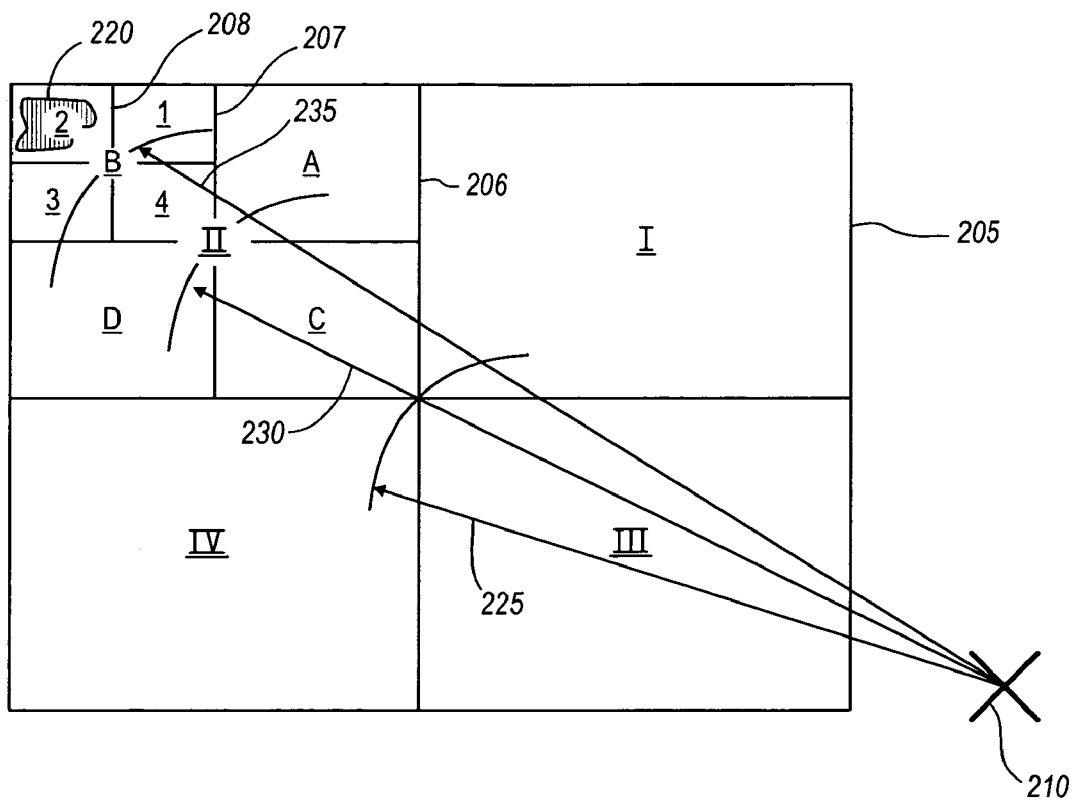
FIG. 2 is an illustration of how viewpoint can be compared to a LOD threshold to selectively stream objects.

Referring to FIG. 2, a depiction is shown illustrating how viewpoint can be compared to a LOD threshold to selectively stream objects. A first distance 225 between a center of quadrant 205 containing objects 220 and a point of view 210 is shown. The first distance 225 can be used to determine if the ratio of the distance 225 to the diagonal of the quadrant 205 is below a certain LOD threshold (e.g. about 10:1) to justify further investigation of the quadrant 205. If the quadrant 205 should be investigated (e.g. the distance 225 is less than the LOD), a server can investigate by checking for child quadrants. In this instance quadrant 205 includes children I-IV. Since this is a quadtree structure, there will always be four children, but other methods of dividing an image can be implemented. A second distance 230 can be used to determine if the ratio of the distance to a diagonal of a quadrant 206 is below the LOD threshold to justify further investigation of the quadrant 206 for objects. The quadrant's 205 children's children (i.e. quadrants A-D) can be investigated until the LOD threshold requirement is not met. For example, a third distance 235 can be compared to the LOD to determine whether quadrant 207 should be investigated. After identifying all of the quadrants that meet the threshold requirement, the object 220 within the identified quadrants can be selectively downloaded with a minimum bounding area of sufficient size.

Figure 3:
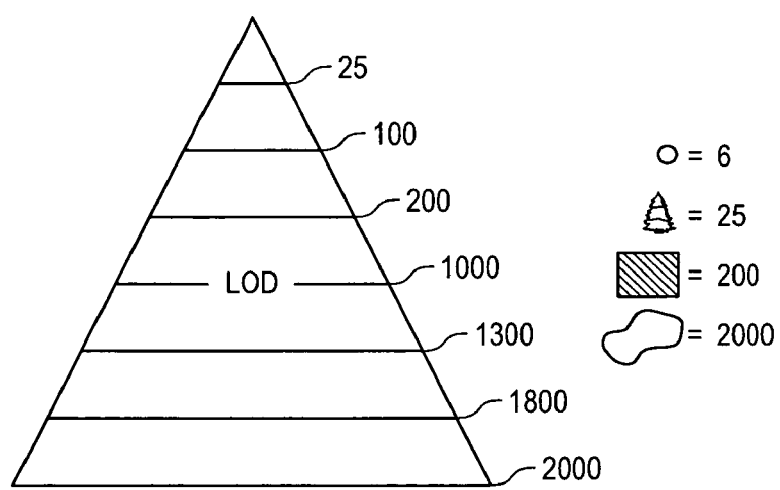
FIG. 3 is depicts a quasi-pyramidal structure illustrating how the objects can be organized into a quadtree.

Referring to FIG. 3, a LOD pyramid is shown illustrating how objects in a quadtree can be organized for selective streaming according to an attribute of the objects. Each object can be assigned an attribute value describing an attribute of the object. For example, the attribute can be size, length, height, volume, largest single dimension, etc. The attribute value can indicate the magnitude, or magnitude relative to other objects, of the attribute. The LOD can be compared with the attribute value to determine whether the object is streamed and presented along with other image data. Thus, when loading objects, the objects with an attribute value that is smaller than required by the LOD will not be streamed nor loaded into the field of view. In this manner, an object that is not necessary for a particular point of view can be excluded and thereby allow for greater speed and performance of GIS.

For example, referring still to FIG. 3, several of the objects illustrated in FIG. 1 have been assigned attribute values which can be applied to the pyramid of LOD values to determine whether the corresponding object will be streamed and presented in response to a request. As shown, relatively small objects, such as people and trees, can have a relatively low attribute value (e.g. 6 and 25 respectively). Relatively large objects, such as buildings and lakes, can have relatively large attribute values (e.g. 200 and 2000 respectively). A LOD corresponding to a location along the pyramid can be selected and it can be determined whether to download the object based on a comparison of the LOD with the attribute value of each object within a quadtree. Thus, returning to the above example, objects having a small size attribute would not be downloaded where the viewpoint of requested data is from the perspective of a satellite, and therefore have a low LOD. According to this example, a low LOD implicates higher resolution and only the objects that is necessary (or in some instances noticeable from the viewpoint) will be streamed. Thus, the LOD may be inversely proportional to the attribute value assigned to the objects.

One advantage of organizing an object in this fashion is to eliminate the need to draw all of the objects in a requested quadrant of a quadtree. Instead, the LOD can be determined based on the size of the quadtree requested. Thus, the LOD can be a function of the distance of the viewing point from the image, among other things. After the required LOD is determined, an algorithm can determine the objects to be displayed based on their attribute value. For example, at a low LOD, small geometrical objects such as people may not need to be downloaded while large objects such as buildings, mountains, and lakes may be. The algorithm can take into consideration a single attribute of the objects, or can take into consideration several attributes of the object, or the system when streaming an object. Small objects, even if downloaded, would be scaled down so small as to be virtually invisible when the image requires a low LOD. It may be more efficient simply to refrain from downloading such objects. Thus, the allocation of such a size attribute creates a quasi-pyramidal structure that can be used to improve streaming of objects in GIS.

Figure 4:
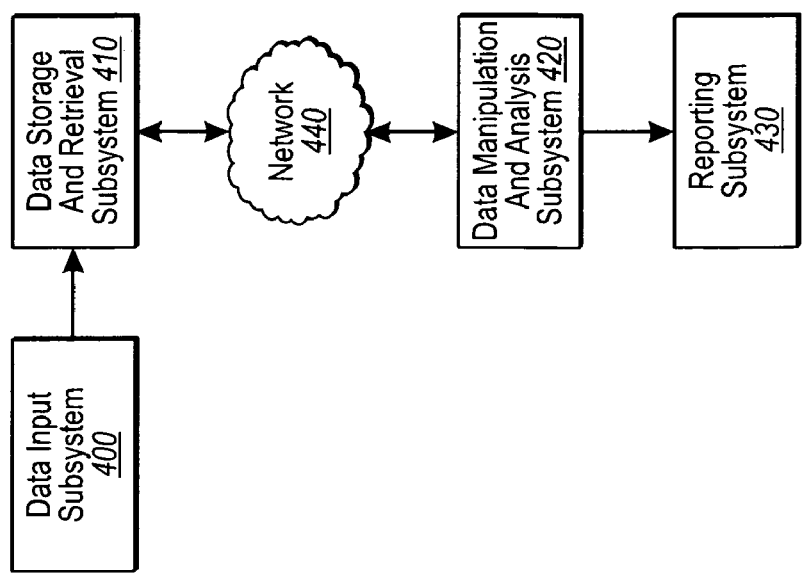
FIG. 4 is a block diagram illustrating various subsystems of GIS.

GIS can be described in terms of subsystems for performing specific functions of the GIS. These subsystems and their functions can be further broken down into additional subsystems, modules, or devices for performing the described, and additional, functions, steps, and acts. Moreover, multiple functions, steps, and acts can be performed by a single subsystem, module, or device. Referring to FIG. 4, a block diagram is shown illustrating various subsystems of GIS according to an example embodiment. GIS can comprise several subsystems, such as a data input subsystem 400, a data storage and retrieval subsystem 410, a data manipulation and analysis subsystem 420, and a reporting subsystem 430. Any of these subsystems can be combined into a particular single assembly or device for accomplishing the described functions. Further, any of the subsystems described herein can be in communication with any of the other subsystems described herein. The particular embodiments described are for illustration of several aspects of example embodiments.

The data input subsystem 400 can collect and perform preprocessing of the spatial data received form various sources and input devices. The data input subsystem 400 can be responsible for transformation of different types of spatial data (e.g., from isoline symbols on a topographic map to point elevations inside the GIS). The data storage and retrieval subsystem 410 can organize the spatial data in a manner that allows for efficient storage, retrieval, updating, and editing. Additional information such as attribute and metadata information can also be stored. Thus, for any given element that is streamed, its attribute information can be determined, or where that element came from (its source). In the case of an object, the object can be assigned attribute values and these attribute values can be retrieved (or determined) and compared to a LOD to determine whether the object is streamed from the data storage and retrieval subsystem to any of the other subsystems of the GIS.

The data manipulation and analysis subsystem 420 can perform analysis of the data received, such as performing tasks on the data, perform aggregates and disaggregates, estimate parameters and constraints, and perform modeling functions. The reporting subsystem 430 can display the spatial data and display results of any analysis conducted in tabular, graphics, or map formats. The GIS illustrated in FIG. 4 can be used to carry out several aspects of several embodiments illustrated herein.

Communication between any of the subsystems can occur across a network (e.g. a LAN, a WAN, or the Internet). For example, as illustrated in FIG. 4, the data storage and retrieval subsystem 410 and the data manipulation and analysis subsystem 420 can communicate across a network 440.

Figure 5:
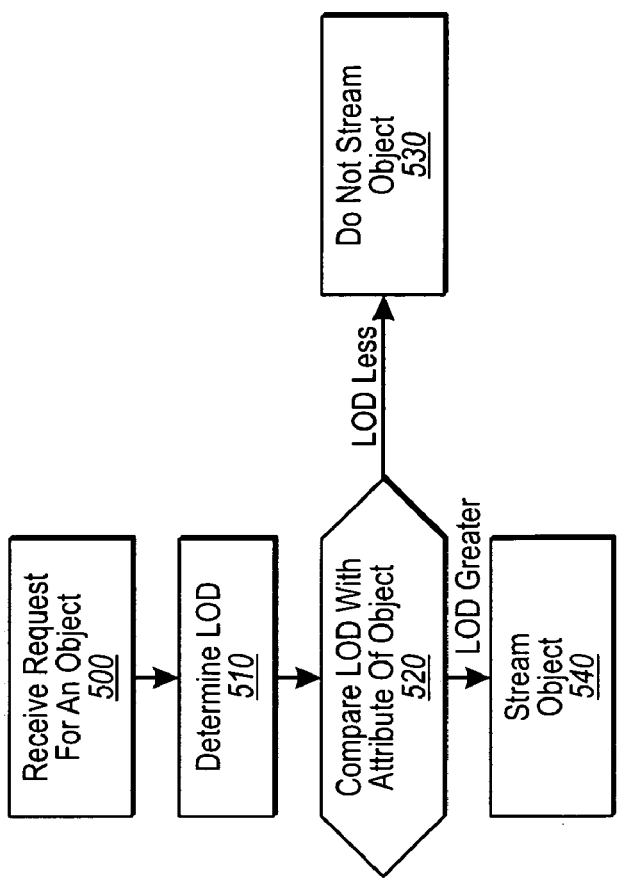
FIG. 5 is a block diagram illustrating a method for streaming objects in GIS system.
Figure 9:
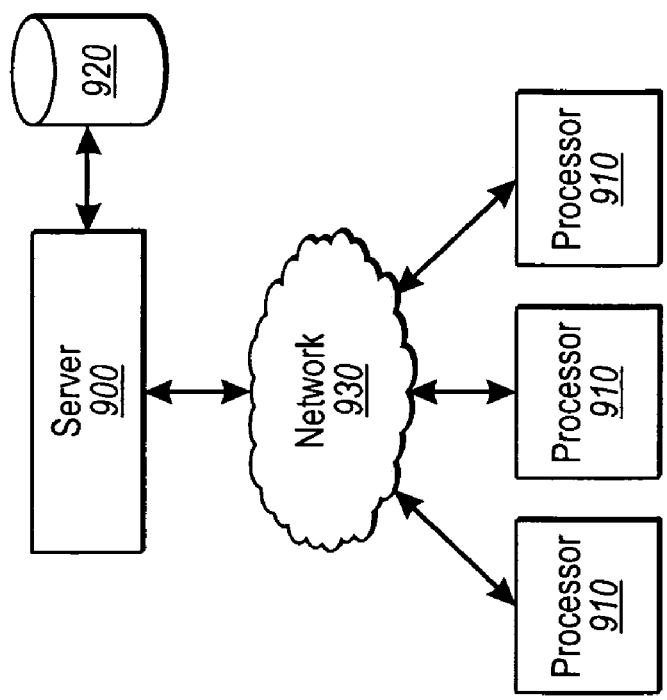
FIG. 9 illustrates GIS.

Referring to FIG. 5, a method for selectively streaming objects in GIS, such as the GIS illustrated in FIG. 4, is shown according to an example embodiment. A request for an object is received (500). The request can be from a data manipulation and analysis subsystem to a data storage and retrieval subsystem of GIS, for example. The request can also include a request for additional image, raster, and/or vector data. The request can be transmitted over a network (e.g. a LAN, WAN, or the Internet). The object can also be stored in a server system that is connected to several processors (e.g. as shown in FIG. 9); and the processors and the server can represent at least one of the GIS subsystems discussed herein. The request can also be between a data storage and retrieval subsystem to a storage processor coupled to a database management processor that can be located locally, or across a network.

A LOD can be determined (510). The LOD can be determined, for example, based at least in part on the size of the request or quadrants requested. The LOD can also be determined based at least in part on a viewpoint at which the request will be presented. For example, a LOD can be determined based on a distance from the viewpoint to the objects requested. The LOD can be determined using an algorithm for calculating a preferred LOD for a particular viewpoint. This algorithm can also be selected, or be selectively varied, by a user depending on a desired LOD in a rendered image. Thus, the LOD can be determined by a machine (e.g. a processor) and/or a user using various settings and algorithms.

The LOD can be compared to an attribute for the object (520). The attribute can be the size, volume, largest single dimension of the object, for example. The comparison of the LOD with the attribute can determine whether the object is streamed. For example, in the instance that the LOD is greater than the attribute value (e.g. indicating that rendering of the object is not necessary) the object will not be streamed (540). In the instance that the LOD is less than the attribute value, the object will be streamed (530).

3. Collaborative Environments in Graphical Information Systems

Where two processors (i.e. within different clients, terminals, computers and/or data manipulation and analysis subsystems) are simultaneously accessing and editing an image, collaboration between the processors can be advantageous. Collaboration between multiple processors accessing image data describing a particular scene can be referred to as a collaboration session. In a collaboration session, session edits (edits associated with a particular collaboration session) made to a scene can be periodically streamed between processors of GIS logged onto the same collaboration session. The session edits made during a collaboration session can be saved as a session list. Session lists can include data structures describing the session edits made during a particular session. For example, session edits can include manipulators, addition of nodes (such as addition of a layer), changes to properties of a node, such as addition or alteration of geometry, addition of attribute data, and and/or other changes made to the image data representing the scene.

When a new processor logs into a collaboration session stored at a server, the new processor can be synchronized with the collaboration session by streaming the image data representing the scene along with the session list entries to the new processor. The new processor can then unpack and execute the session list on the image data representing the scene to synchronize the scene with the collaboration session stored at the server.

The image data describing the scene that is streamed to the processor can be limited to the image data needed to display the viewpoint of the processor. Thus, a processor may only require a portion of the image data describing the scene and can receive only this portion of the image data describing the scene from the server. The processor can receive, however, the entire session list with all session list entries describing all edits made to the entire scene for the particular collaboration session requested. The processor can receive and unpack the session list and apply the relevant edits to the portion of the image data to synchronize the collaboration session at the processor with the collaboration session stored at the server.

In the instance that the new processor has previously accessed a particular collaboration session and has a portion of the session list stored in memory, the new processor can synchronize the local session list by downloading from the server any additional session list entries to the local session list in order to synchronize the local session list with the session list stored at the server. This synchronization can be based on a timestamp associated with the session list entries, or by other means for synchronization of the local session list at the processor and the session list stored at the server. Thus, when a processor is accessing and/or editing a session and logs off, the processor can be synchronized with the collaboration session when the processor logs back on to the same collaboration session by receiving the session list entries including any additional session list entries describing edits made (or nodes added) while the processor was logged off.

There can be multiple collaboration sessions for a given scene. A new processor may not receive, however, session data for a different collaboration session than the processor is logged on. Thus, even though the new processor has requested session data for a particular scene, access to the different collaboration sessions of a particular scene can be independently controlled based on the privileges offered to the particular processor. Therefore, a request for image data can be limited to only to the scene.

For example, the scene can be a particular city and the collaboration session can include a session list of edits and nodes which have been associated with the scene. The scene can have multiple collaboration sessions associated with it, and each scene and session can constitute associated data structures. Thus, the desired scene and session can be requested by a scene identifier and collaboration session identifier and the desired scene and session can be retrieved from remote memory (at the server) and transmitted to the client and stored in local memory at the client based on this scene identifier and collaboration session. A collaboration session can include session list entry data structures associated with a particular scene. These session list entry data structures can describe results of GIS analysis, edits to graphical or attribute data, favorite places within the image data, or any other manipulation, edit, addition, description, or modification of the image data.

Edits can be updated as they are made to the collaboration session by other processors accessing the same collaboration session. This collaboration can be facilitated by streaming changes made to the session list to the other processors accessing the same session. Updating of sessions between various processors can be referred to as synchronization of session data.

When a processor logs onto a server and requests a particular scene and session, the processor receives image data representing the particular scene, such as the scene of a city, along with a session list. The session list includes all edits to the image data for the session. After receiving the image data representing the scene along with the session list, the processor can edit the image data. For example, the processor can add a building to the image data. This building can be represented as a new session list entry including a description of the edit conducted at the processor. The processor transmits the new session list entry (e.g. describing the addition of the building) to the server. The processor also updates its local session list with the new session list entry. The server distributes the new session list entry to any other processors accessing the same scene and session. The server also updates the session list stored at the server by including this new session list entry describing the edit to the server's session list. Processors receiving the new session list entry can update a session list stored locally (at the processor) with the new session list entry. Thus, if a new processor logs on, the new processor can receive the image data for the scene along with the current session list (including the new session list entry) from the server.

Within the collaboration environments, different processors can be given different access to data and/or privileges. A processor, or multiple processors, can have a high level of privileges (referred to herein as a "pro-client") while other processors can have a lower level of privileges (referred to herein as a "thin-client"). For example, the pro-client can have access to all session data and can be allowed to make changes to the session lists stored at the server. The pro-client can also have control over access and privileges of the thin-clients. The pro-client can, for example, dictate a viewpoint, flyover course, editing privileges, or other access and/or privileges for a thin-client, or for several thin-clients. The pro-client can control the layers viewed by the thin-client(s). For example, the pro-client can remove a building, tree, object, or other object layer from the view of the thin-clients.

The pro-client can make edits to the data stored at the server and session list entries describing edits made by the pro-client can be stored in a session list at the server. The pro-client can also be given access to the image data stored at the server to make permanent changes. The thin-client(s) access to make changes to the image data or to the collaboration session at the server can be limited by the pro-client, or by settings in the system. The thin-client(s) can be limited in their ability to edit the image data or submit session list entries to the session list stored at the server. The thin-client(s) can be allowed to store a local session list and can store the session list entries created by the thin-client to the locally stored session list only. In other terms, the thin-client can have "read only" access to the image data and session list stored at the server, while the pro-client can have both "read" and "write" access to the image data and session list stored at the server.

Thus, the level of collaboration between different processors can be varied based on the client's status. For example, session list entries describing edits made by a pro-client can be distributed by the server to all clients accessing the session, while session list entries describing edits made by a thin-client to a local session list may not, in some embodiments, be distributed to other processors accessing the same session at the server. These processors can be part of data manipulation and analysis subsystems of GIS and can be accessing and editing image data from a server as part of a data storage and retrieval subsystem.

As previously mentioned, editing of image data can include use of various manipulators. A manipulator can refer to an instruction or algorithm for editing an image. Examples of manipulators include such layer manipulations as cut, feather, normalization, transparency, etc.

Session list entries describing manipulators can also be associated with image data, such as objects, and can be stored at the server along with the image data. The session list entries can be streamed along with the image data upon receiving a request at the server for the image data. Thus, when a first processor creates an edit to an image using a manipulator, the image may not be permanently edited, but rather descriptions of the manipulators executed by the editor can be stored along with the image data at the server such that when the same image data is requested (e.g. by a second processor) the image data can be streamed along with description of the manipulators performed on the image and executed at the second processor.

Figure 6:
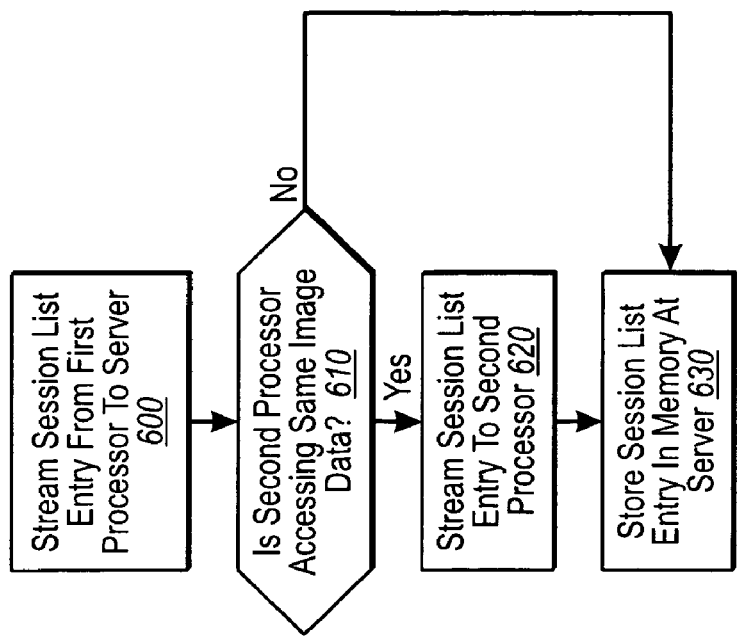
FIG. 6 illustrates a method for synchronization of multiple GIS processors.

Referring to FIG. 6, a method for synchronization of multiple processors within GIS is shown according to an example embodiment. In GIS, a session list entry can be streamed from a first processor to a server (600). The session list entry can be received by the server and the session list entry can represent an edit (or editing instructions) conducted on image data at the processor. It can be determined whether another processor is accessing the same image data and session that was edited at the first processor (610). Several processors can be coupled to the server and it can be determined whether any of the multiple processors are accessing the same image data. In the instance that another processor is accessing the same image data and session, the session list entry can be streamed to the other processor (620). The session list entry can be received by the other processor and the other processor can execute the edit and view a result of the edit by the first processor. In this manner, each processor accessing the same image data can receive, execute, and view edits made by other processors providing for synchronization between the various processors. The session list entry can be stored in memory at the server (630). The session list entry can be stored separate from corresponding image data and streamed along with the image data in response to a request for the image data and session. Thus, the image data may be stored in its original form separate from session list describing edits the image data. As a result, requests for the original image data with or without the edits can be distributed. Also, multiple sessions can be stored for the same image data simultaneously without requiring multiple copies of the image data.

It should be appreciated that different GIS configurations can be used to practice these embodiments. For example, GIS comprising multiple processors, but without a central server can be implemented. In such embodiment, the processors would periodically stream the descriptions of edits (e.g. session list entries) to the other processors without first streaming the descriptions of the edits to a server.

The frequency of the streaming of the edits can be at any period, can be predetermined, selected by an administrator, or can be dynamically determined based on the level or amount of editing conducted by a user, or a combination thereof. The server can store new session list entries received simultaneously with the distribution of the new session list entry to processors. However, the server will wait until the new session list entry is stored in the session list for the corresponding session and scene before transmitting the entire session list. Thus, a processor that logs onto the server will receive a complete session list including the new session list entry.

Rather than periodically streaming every edit, a supplemental session list can be constructed and updated describing edits made to image data over an amount of time. A supplemental session list can be an abbreviated list of manipulators and other tasks and actions taken upon a particular quadtree or portion of image data including two dimensional and/or three-dimensional image data.

A comprehensive session list can be stored at the server. Upon longing into a server, a processor can download the comprehensive session list. Supplemental session lists can be created at the processor, which can include a list of entries describing recent edits conducted, and this supplemental session list can be streamed to the server such that the server can update the comprehensive session list stored at the server. Upon receiving the supplemental session list from a processor, the server can also stream the supplemental session list to each processor logged onto the server so that each processor can update their copy of the comprehensive session list stored at each processor and retain an up-to-date comprehensive session list of manipulations of the image data. This session list can be used by each processor for queries to determine whether session list entries themselves need to be streamed to the processor.

A collaborative environment in GIS can include streaming of scenarios between processors. A scenario can include a result of GIS analysis. A scenario can also include a set of parameters for performing GIS analysis. The scenario can include analysis of two and/or three-dimensional spatial data. A collaborative environment in GIS can include the ability for a first processor to conduct analysis using a set of parameters and provide a result of the analysis to a second processor as a scenario such that the user of the second processor can view the scenario, including the results and/or the parameters of the scenario. After viewing the scenario, the user of the second processor can accept or edit the parameters of the scenario. The user of the second processor can also conduct an entirely different second scenario, and stream the second scenario, comments, the edited first scenario, and/or an acceptance of the first scenario to the first processor for review and consideration by the user of the first processor as a response. In this manner, a collaborative environment can be provided for multiple processors within GIS to run scenarios and present the results and/or parameters to other processors such that the other processors can respond with suggested changes, or accept the scenario suggested by the first processor.

For example, one type of analysis that users of a graphical information system may want to consider is the location of a dam in different geographic locations. Using a collaborative GIS environment described herein, a first GIS user could suggest a first location for the dam, conduct geo-spatial analysis to determine the effect of the first location of the dam, and stream the scenario (e.g. including the location of the dam and/or size of the dam as parameters) along with a result of analysis conducted by the first processor to determine the effect of the location of the dam. A second processor can receive the scenario including the location of the dam and/or results of the GIS analysis and review the scenario. The second processor can accept the scenario and respond by streaming an indication of the acceptance to the first processor. The user of the second processor can also edit the parameters of the scenario, such as the location or size of the dam, and conduct additional geo-spatial analysis to determine the effect of the change in the parameters, thereby conducting a second scenario. The second scenario (e.g. including a result and/or parameters of the analysis conducted by the second processor) can be streamed in response to the first GIS processor for review, editing, and/or approval. Thus, a collaborative GIS environment can include a method of proposing scenarios between multiple processors within the GIS and allowing for users of each processor to review, edit, accept, comment, and/or propose new scenarios to users of the other processors.

Figure 7:
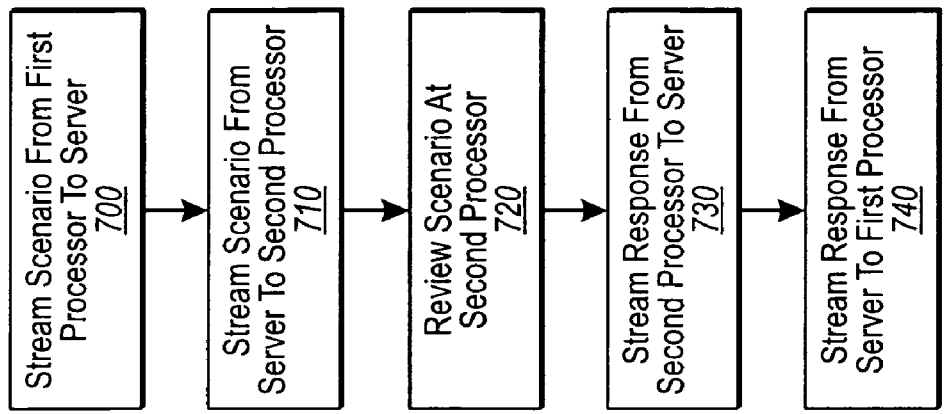
FIG. 7 illustrates a method for providing a collaborative environment in GIS.

Referring to FIG. 7, a method for providing a collaborative environment in GIS is illustrated. A scenario can be streamed from a first processor to a server (700). The scenario can comprise a result of analysis and/or parameters for analysis. The scenario can be streamed from the server to a second processor (710). The scenario can be received by the second processor and a user of the second processor can review the scenario (720). The user of the second processor can accept, edit, revise, comment on, and/or create a new scenario in response to the first scenario received. The response to the first scenario can be streamed to the server (730). The server can receive the response and stream the response to the first processor (740). The first processor can receive the response. In the instance that the scenario was not accepted in response by the second processor, the user of the first processor can review the response by the user of the second processor, which can include edits, revisions, comments, and/or a new scenario; and the user of the first processor can respond by transmitting an acceptance, comments, edits, revisions, and/ or a new scenario. Scenarios, as well as responses to scenarios, can be distributed among any number of processors. Thus, multiple processors can collaborate by streaming of scenarios and responses to scenarios between the processors. Distribution of the scenarios and responses to scenarios can be controlled by a server, which can be in communication with the processors across a network, such as the internet.

Collaborative GIS environments can also include streaming of superimposed images. The superimposed images can include a window area where a portion of a first image superimposed over a second image is removed (e.g. not displayed) exposing (e.g. displaying) a portion of the second image. The location of this window can be animated and instructions for animating the window can be streamed along with, or separate from, the images. The images can include a relation, which can provide GIS user with perspective as well as other information. For example, the two images can depict the same area of the earth from different perspectives. The window can facilitate comparison of the area of the earth from the two different perspectives. Examples of changes in perspectives can include physical changes in the area such as over a period of time, changes in perspective due to changes in equipment used to capture the images, changes in perspective due to changes of settings of the equipment used to capture the images (e.g. different spectral capture settings), changes in setting in equipment used to display the images, changes in edits made to the images, or other changes made to provide a different perspective of the image.

Changes in perspective can also illustrate the results of GIS analysis or GIS manipulation of the images. For example, where GIS image has been manipulated a first manipulated image can be superimposed over the original image without the manipulation. A window can therefore provide an indication of the extent of manipulation or editing conducted on the image. The first superimposed image may include objects, objects, vectors, or other graphical objects added to the image, which can be removed in the area of the window revealing the original image or a different version of the image. More than two images may be superimposed, and more than one window can be displayed for exposing different locations of the different images. The window can be embodied as a vertical swipe, for example, revealing the first image on the left side of the swipe and the second image on the right side of the swipe. The images can include two dimensional image data and/or three-dimensional image data.

The animated swipe embodiment of the window allows user to compare at least two raster layers in a viewer at the same time using a vertical or horizontal swipe line. The two layers can both be registered to the same projection system. The viewer shows the top raster layer in the left portion and the bottom layer in the right portion of the viewer. Various aspects of the swipe can be selected. For example, the position of the swipe on the screen, the direction, whether vertical or horizontal.

The window can be animated. For example, the window can be animated by changing the window's position, size, or other aspect of the window over a period of time. For example, the window can fade in or fade out, flicker, or move about the viewer. The window can be any size and can expose any portion of the superimposed images. The superimposed images, window, and instructions for animation can be streamed between processors. The animations can include animated viewer swipes, animated fades, and/or animated flicker. The speed of the animation can also be varied such that the rate in which the window is animated can be changed. Thus, two raster layers can be compared at the same time using an animated window and the animated window can be streamed between and viewed by multiple users in the collaborative environments disclosed herein.

Figure 8:
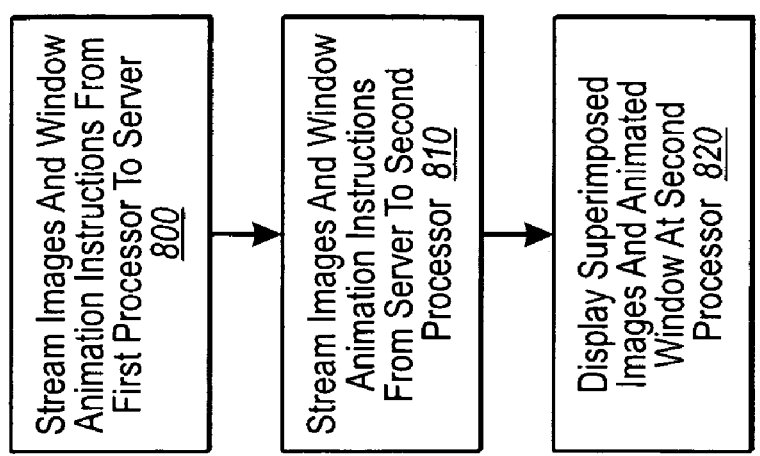
FIG. 8 illustrates a method for providing a collaborative environment in GIS.

Referring to FIG. 8, a method for providing a collaborative environment in GIS is shown. Images can be streamed within GIS from a first processor to a server along with instructions for displaying a window animation (800). The images can also be streamed along with instructions for superimposing the images. Instructions for displaying the window and/or animating the window can also be streamed along with, or separate from, the images. The images and window animation instructions can be streamed from the server to a second processor (810). The GIS processors can be located remote from the server across a network, such as the Internet. The images can be displayed at the second processor along with the animated window. Parameters of the animated window can be reviewed at the second processor. A response to the superimposed images and animated window can be streamed from the second processor to the server, and subsequently from the server to the first processor. The response can include comments, changes to the image or animation parameters, impressions or information discovered from the images, or other information.

4. Example Operating Environments

Referring to FIG. 9, a block diagram is shown illustrating GIS according to an example embodiment. The GIS can include a server 900 and several processors 910. The server 900 and processors 910 can represent any of the GIS subsystems discussed above. Certain of the GIS subsystems may also be eliminated according to certain embodiments. For example, the processors 910 can represent data manipulation and analysis subsystems as well as reporting subsystems. The server 900 can represent a data storage and retrieval subsystem. The server can be coupled to memory 920 for storage of GIS data including object data, vector data, raster data, and/or other image data. It should be appreciated that additional hardware, memory, processors, and storage devices can be included, and the various types of data can be stored in a single data storage medium, or multiple data storage mediums.

As illustrated, the server 900 can be located across a network 930 (e.g. a LAN, WAN, and/or the Internet) for communication with any of the processors 910. A processor 910 can determine a LOD for a request, and compare this LOD to an attribute value for an object stored in a particular quadtree of the image data stored in the storage medium 920. Based on this comparison, the server 900 can selectively retrieve and stream the object to the requesting processor 910 for analysis and/or reporting. The processors 910 can request data (e.g. object data, raster data, vector data, and/or other image data) from the server 900. The server 900 can receive the request and access the data in the data storage medium 920.

The image data in the data storage medium 920 can be organized. For example, the image data in the data storage medium 920 can be organized according to quadtrees as discussed above. The object data can also be organized based on attribute value, type of an object, etc.

The GIS illustrated in FIG. 9 can also be a collaborative system. For example, the GIS can facilitate collaboration between the processors 510 as described above. Thus the GIS can provide for real time raster edits, streaming of scenarios, streaming of session lists, and streaming of superimposed images with animated windows. The processors 510 can be conventional or special purpose computers. The server 500 can also be a conventional or special purpose server. The data storage medium 520 can be internal or external to the server, and can also be located across a network from the server 500 and coupled to other processors for implementing storage processes. Additional processors and hardware can be implemented for performing the above described functions. Thus, any of the embodiments may comprise any number of special purpose and/or general-purpose computers including various computer hardware, as discussed in greater detail below.

Embodiments within the scope of embodiments illustrated herein can also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 10 and the following discussion are intended to provide a brief, general description of a suitable computing environment in which several embodiments may be implemented. Although not required, several embodiments will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the embodiments illustrated herein may be practiced in network computing environments with many types of computer system configurations, including personal computers, hand-held devices, multi-processor systems, microprocessor-based or programmable consumer electronics, network PCs, mini-computers, mainframe computers, and the like. Several embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 10, an exemplary system for implementing several embodiments includes a general purpose computing device in the form of a conventional computer 1020, including a processing unit 1021, a system memory 1022, and a system bus 1023 that couples various system components including the system memory 1022 to the processing unit 1021. The system bus 1023 may be any of several types of bus structures including a memory bus or memory controller, a peripheral bus, and a local bus using any of a variety of bus architectures. The system memory includes read only memory (ROM) 1024 and random access memory (RAM) 1025. A basic input/output system (BIOS) 1026, containing the basic routines that help transfer information between elements within the computer 1020, such as during start-up, may be stored in ROM 1024.

The computer 1020 may also include a magnetic hard disk drive 1027 for reading from and writing to a magnetic hard disk 1039, a magnetic disk drive 1028 for reading from or writing to a removable magnetic disk 1029, and an optical disk drive 1030 for reading from or writing to removable optical disk 1031 such as a CD-ROM or other optical media. The magnetic hard disk drive 1027, magnetic disk drive 1028, and optical disk drive 1030 are connected to the system bus 1023 by a hard disk drive interface 1032, a magnetic disk drive-interface 1033, and an optical drive interface 1034, respectively. The drives and their associated computer-readable media provide nonvolatile storage of computer-executable instructions, data structures, program modules and other data for the computer 1020. Although the exemplary environment described herein employs a magnetic hard disk 1039, a removable magnetic disk 1029 and a removable optical disk 1031, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 1039, magnetic disk 1029, optical disk 1031, ROM 1024 or RAM 1025, including an operating system 1035, one or more application programs 1036, other program modules 1037, and program data 1038. A user may enter commands and information into the computer 1020 through keyboard 1040, pointing device 1042, or other input devices (not shown), such as a microphone, joy stick, game pad, satellite dish, scanner, or the like. These and other input devices are often connected to the processing unit 1021 through a serial port interface 1046 coupled to system bus 1023. Alternatively, the input devices may be connected by other interfaces, such as a parallel port, a game port or a universal serial bus (USB). A monitor 1047 or another display device is also connected to system bus 1023 via an interface, such as video adapter 1048. In addition to the monitor, personal computers typically include other peripheral output devices (not shown), such as speakers and printers.

The computer 1020 may operate in a networked environment using logical connections to one or more remote computers, such as remote computers 1049a and 1049b. Remote computers 1049a and 1049b may each be another personal computer, a server, a router, a network PC, a peer device or other common network node, and typically include many or all of the elements described above relative to the computer 1020, although only memory storage devices 1050a and 1050b and their associated application programs 1036a and 1036b have been illustrated in FIG. 6. The logical connections depicted in FIG. 6 include a local area network (LAN) 1051 and a wide area network (WAN) 1052 that are presented here by way of example and not limitation. Such networking environments are commonplace in office-wide or enterprise-wide computer networks, intranets and the Internet.

When used in a LAN networking environment, the computer 1020 is connected to the local network 1051 through a network interface or adapter 1053. When used in a WAN networking environment, the computer 1020 may include a modem 1054, a wireless link, or other means for establishing communications over the wide area network 1052, such as the Internet. The modem 1054, which may be internal or external, is connected to the system bus 1023 via the serial port interface 1046. In a networked environment, program modules depicted relative to the computer 1020, or portions thereof, may be stored in the remote memory storage device. It will be appreciated that the network connections shown are exemplary and other means of establishing communications over wide area network 1052 for streaming GIS data may be used.

Embodiments disclosed herein may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a graphical information system (GIS), a method for providing collaboration between multiple processors within the GIS, the method comprising:
receiving from a first processor at least one of the members of a set that includes:
a manipulator conducted on an image by the first processor;
a session list entry describing an edit made to the image by the first processor;
a scenario including parameters for geo-spatial analysis of the image conducted by the first processor and/or a result of the geo-spatial analysis conducted by the first processor; and
images along with computer executable instructions for animating a window, the animated window comprising a removed portion of a first image superimposed over a second image, wherein the animated window exposes different portions of the second image at different points in time; and transmitting to a second processor at least one of or any combination of:
the manipulator;
the session list entry;
the scenario; and
the images along with the instructions for animating the window.

2. A method according to claim 1, further comprising:
determining whether the second processor is accessing image data that the first processor is accessing prior to transmitting to the second processor at least one of or any combination of the manipulator; the session list entry; the scenario; and the images along with the instructions for animating the window.

3. A method according to claim 1, wherein the at least one of, or any combination of, the manipulator, the session list entry, the scenario, and the images along with instructions for animating the window are received from the first processor across a network.

4. A method according to claim 1, wherein:
the first processor is at least a part of a first data manipulation and analysis subsystem;
the second processor is at least a part of a second data manipulation and analysis subsystem; and
at least one of, or any combination of, the manipulator, the session list entry, the scenario, and the images along with instructions for animating the window are received from the first processor by a server, wherein:
the server is at least a part of a data storage and retrieval subsystem; and
the server transmits as least one of, or any combination of, the manipulator, the session list entry, the scenario, and the images along with instructions for animating the window to the second processor.

5. A method according to claim 1, wherein:
the manipulator is received from the first processor and transmitted to the second processor; and
the manipulator is a layer manipulator.

6. A method according to claim 1, further comprising:
receiving the session list entry and incorporating the session list entry into a comprehensive session list stored in memory; and
transmitting the session list entry to the second processor such that the second processor incorporates the session list entry into a copy of the comprehensive session list stored in memory at the second processor.

7. In a graphical information system (GIS), a method for a first processor accessing image data to collaborate with a second processor accessing the same image data, the method comprising:
accessing the image data at the first processor;
performing at the first processor at least one of the members of a set that includes:
executing a manipulator on the image data;
performing an edit of the image data;
performing a scenario including analysis of the image data; or
displaying at the first processor a first image superimposed over a second image with an animated window removing a portion of the first image to expose different portions of the second window in time; and
transmitting from the first processor to a server for distribution to the second processor at least one of the members of the set that includes:
a session list entry describing the manipulator;
an session list entry describing the edit;

the scenario including parameters for analysis of the image conducted by the first processor and/or a result of the analysis conducted by the first processor; and the images along with instructions for animating the window.

8. A method according to claim 7, wherein accessing and transmitting are conducted across a network with the server.

9. In a graphical information system, a method for displaying superimposed images, the method comprising:

displaying a first image;

displaying a second image superimposed over the first image;

displaying an animated window exposing at least a portion of the first image comprising:

removing at least a portion of the second image so as to expose the underlying portion of the first image located underneath the window portion; and animating the window portion so as to remove different portions of the second image at different points in time so as to expose different portions of the first image at the different points in time; and streaming the images along with computer executable instructions that when executed on a processor coupled to a display cause the first and second images to be displayed along with the animated window.

10. A method according to claim 9, wherein the first and second images include a depiction of the same portion of earth taken from different perspectives.

11. A method according to claim 10, wherein the different perspectives are a result of at least one of, or any combination of:

physical changes in the area over a period of time;
different equipment used to produce the images;
different equipment settings used to produce the images;
different spectral depictions of the area;
editing of at least one of the images;
manipulation of at least one of the images; and
objects added to at least one of the images.

12. A method according to claim 9, wherein the window is animated according to at least one of, or any combination:

changing the window's position over time; and
changing the window's size over time.

\* \* \* \* \*